(12) United States Patent
Yaku et al.

(10) Patent No.: US 7,446,306 B2
(45) Date of Patent: Nov. 4, 2008

(54) PHOTOELECTRIC ENCODER HAVING MULTIPLE LIGHT-RECEIVING ELEMENTS

(75) Inventors: Toru Yaku, Kawasaki (JP); Hiroaki Kawada, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/675,257

(22) Filed: Feb. 15, 2007

(65) Prior Publication Data

US 2007/0187583 A1    Aug. 16, 2007

(30) Foreign Application Priority Data

Feb. 15, 2006   (JP) .............................. 2006-038457

(51) Int. Cl.
*G01D 5/34* (2006.01)
(52) U.S. Cl. ........................... 250/231.13; 250/231.14; 356/616
(58) Field of Classification Search ................................ 250/231.11–231.18, 237 G; 33/1 PT; 356/614, 356/616, 617
See application file for complete search history.

(56) References Cited

U.S. PATENT DOCUMENTS

| | | | |
|---|---|---|---|
| 6,486,467 B1 * | 11/2002 | Speckbacher et al. ... | 250/237 G |
| 6,649,925 B2 * | 11/2003 | Talmi ...................... | 250/559.1 |
| 6,742,275 B2 * | 6/2004 | Mayer et al. .................. | 33/707 |
| 6,844,542 B2 * | 1/2005 | Kirschbaum et al. ... | 250/231.13 |
| 2002/0021450 A1 * | 2/2002 | Aoki .......................... | 356/499 |
| 2004/0173737 A1 * | 9/2004 | Shimomura et al. .... | 250/231.13 |
| 2005/0087681 A1 * | 4/2005 | Chin et al. ............. | 250/231.13 |
| 2006/0202112 A1 * | 9/2006 | Mizutani ............... | 250/231.13 |

* cited by examiner

*Primary Examiner*—Thanh X Luu
*Assistant Examiner*—Francis M Legasse, Jr
(74) *Attorney, Agent, or Firm*—Rankin, Hill & Clark LLP

(57) ABSTRACT

In a photoelectric encoder (incremental encoder and absolute encoder) having a detector that is displaceable relative to a scale having a predetermined pattern (incremental pattern and pseudorandom pattern) formed thereon, the detection range, to be simultaneously detected, of the pattern is divided in at least the detection direction, and a plurality of light-receiving systems are provided to detect each of the respective detection areas, whereby measurement of a wide detection range is enabled by using a small-sized and simple optical system and light-receiving system.

12 Claims, 15 Drawing Sheets

PHOTOELECTRIC ENCODER HAVING MULTIPLE LIGHT-RECEIVING ELEMENTS

CROSS-REFERENCE TO RELATED APPLICATION

The disclosure of Japanese Patent Application No. 2006-38457 filed on Feb. 15, 2006 including specifications, drawings and claims is incorporated herein by reference in its entirety.

BACKGROUND OF THE INVENTION

1. Field of the Invention

The present invention relates to a photoelectric encoder having a detector that is relatively displaceable to a scale having a predetermined pattern formed thereon, and in particular to a photoelectric encoder capable of measuring a wide detection range using a simple and small-sized optical system and light-receiving system.

2. Description of Related Art

To decrease the sensitivity to stains on a scale in a photoelectric encoder, for example, an incremental type photoelectric linear encoder, it is necessary to widen the detection range on the scale. However, if the detection range is widened, there arises a problem in that the optical system in the inner part of the detector is made large in size.

Also, as has been described in FIG. 1 of Japanese Published Unexamined Patent Application No. Hei-7-286861 (Patent Document 1), a so-called absolute-type encoder has been known, which obtains the absolute position by detecting a pseudorandom pattern disposed on the main scale.

For example, a pattern called an "M-sequence code," which is described in FIG. 1 of J T M Stevenson et al. "Absolute Position Measurement Using Optical Detection of Coded Patterns," J. Phys, E: Sci. Instrum. 21(1988) 1140-1145 (Non-patent Document 1) may be used as the pseudorandom pattern.

In the absolute type encoder, a part of the pattern disposed on a scale is detected, and it is determined by comparison with which part of the entirety of the pseudorandom pattern the pattern is made coincident. In detail, as has been described in FIG. 1 and FIG. 3(A) of Japanese Published Unexamined Patent Application No. Hei-8-29200 (Patent Document 2), correlation coefficients between the detection pattern and the pseudorandom pattern are calculated, and a part where the correlation coefficient is made highest is made into the absolute position.

With a method for detecting the absolute position based on such a pseudorandom pattern, if the length for which the absolute position (that is, the absolute detection range) can be detected is attempted to be lengthened, the periodic cycle of the pseudorandom pattern is lengthened, and it is necessary to detect a long pattern to obtain a favorable correlation peak. However, there is a problem in that, since an optical system having a wide field of view is required to detect a long pattern and a large lens is used, the optical system is made large.

As shown in FIG. 1 and FIG. 2, Japanese Published Unexamined Patent Application No. 2004-317503 (Patent Document 3) describes that, as means to improve the above-described problem, the lens array imaging optical systems 3 and 4 are double stacked and used. With this method, after patterns 21 and 22 (O in FIG. 2) on the scale 2 are imaged as an intermediate image O', it is imaged as a detection image O" on the light-receiving element 19. In the drawings, reference numeral 1 denotes a scanning unit, 10 denotes a printed circuit board, 11 denotes a light source, L denotes a light beam, 12 denotes a side wall, 13 denotes a condenser lens, 15 denotes a glass plate, A denotes an optical axis, B denotes a light flux, and reference numerals 31a through c and 41a through c denote lenses.

However, in Patent Document 3, since the lens array imaging optical systems are double stacked, it is necessary to accurately set the positional relationship of both the optical systems in order to obtain the final detection image. This becomes a large technical problem in practically constructing the optical system.

Further, in Japanese Published Unexamined Patent Application No. Hei-9-229717 (Patent Document 4), absolute positions at a plurality of detection points are detected, and checked whether difference between detected position data and distance between detection points is coincident or not, to obtain higher reliability of detecting absolute position.

However, both in Patent Documents 4, wide range pattern, which can detect 2N-1 bit in the M-sequence code generated by an N-stage shift register, for example, is necessary to calculate at least absolute position.

SUMMARY OF THE INVENTION

The present invention was developed to solve the above-described conventional problems, and it is therefore an object to secure a wide detection range using an optical system and a light-receiving system that are comparatively simple.

The present invention provides a photoelectric encoder having a detector that is displaceable relative to a scale having a predetermined pattern formed thereon, and is provided with a plurality of light-receiving systems which have the detection ranges to be simultaneously detected of the pattern divided in at least the detection direction, and detect the detection areas, respectively, whereby the above-described problems are solved.

A light shielding plate may be disposed between the light-receiving systems.

Also, an imaging optical system may be provided for each of the light-receiving systems.

In addition, the imaging optical system may be made into a single-side or a double-side telecentric optical system.

Further, the detection range may be divided in the direction perpendicular to the detection direction.

Still further, it may become possible to detect a partial stain of the detection range based on the amplitude of outputs of the divided and detected points.

Also, output of points other than those where a stain is detected may be used for detection of displacement.

Also, the pattern may be made into an incremental pattern.

Further, by averaging the individual divided and detected outputs, the amount of movement can be detected.

Also, by relatively comparing the individual divided and detected outputs with each other, the posture detection of the detector may be carried out.

In addition, the pattern may be made into a pseudorandom pattern.

By individually calculating the correlation of the divided and detected patterns, the position at which the respective correlation peaks are in good order and the intervals between the respective correlation peaks is within a predetermined range may be determined as an absolute position.

In addition, where the height of the correlation peak is lower than the threshold value, the corresponding individual detection pattern may not be used for correlation calculation.

Further, the highest correlation peak is obtained by carrying out correlation calculations in the entire area of the periodic cycle for one of a plurality of individual detection patterns, and the correlation calculation may be carried out only at the peripheries thereof.

According to the present invention, since the detection range to be simultaneously detected is devised so as to be divided and detected respectively, a wide detection range can be secured even if individual detection areas are small. Therefore, it is sufficient that the individual detection areas are small, and it becomes possible to configure an optical system with lens having a small diameter and a short focal distance, wherein the entire size can be relieved. Also, if a light shielding plate is provided, light from the optical systems adjacent to each other can be shielded. Further, a detection system that is insensitive to air gap fluctuations can be composed by employing a single-side or a double-side telecentric optical system as the imaging optical system.

In particular, where the present invention is applied to an incremental encoder, since detection of the movement amount does not depend on the relative positional relationship of individual detection areas, a comparatively simple optical system and light-receiving system may be composed. Also, with an averaging effect in a wide detection range, the sensitivity to stains can be reduced. Also, it becomes possible to detect a partial stain of the detection range, wherein an averaging process at a point other than the stained point is enabled. Also, it becomes possible to detect the posture of a detector by relatively comparing the outputs at the individual detection areas with each other.

Also, where the present invention is applied to an absolute encoder, a long pseudorandom pattern can be detected by dividing the pattern and detecting the same. Further, by dividing the pattern, carrying out a correlation calculation and collating the order and interval of the individual correlation peaks with the design value, a correlation peak can be obtained in a non-continuous detection pattern. In addition, without using individual detection patterns of low correlation peaks, detection of high reliability can be brought about. In addition, by carrying out correlation calculation in the entire area of the periodic cycle range only at one of the individual divided detection patterns, and narrowing the range of correlation calculation by assuming that the other divided detection patterns are in the vicinity of the highest correlation peak, the calculation time can be saved. Further, by detecting by means of, for example, a two-dimensional light-receiving array element and cutting out an individual detection pattern at a portion free from any stain, detection not influenced by a stain can be carried out.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, a detailed description is given of embodiments of the present invention with reference to the accompanying drawings.

First, a description is given of an embodiment in which the present invention is applied to an incremental encoder.

Figure 1:
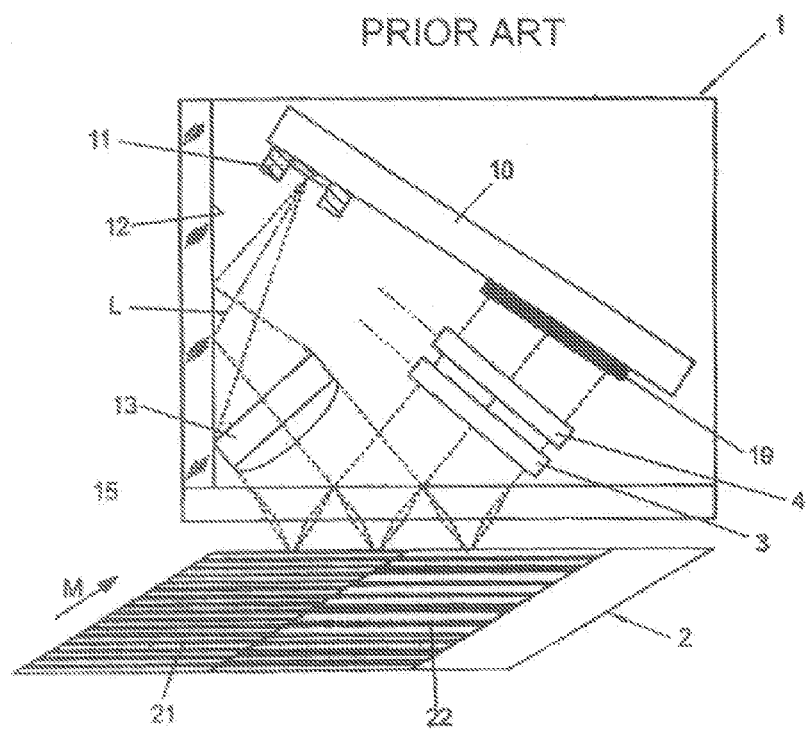
FIG. 1 is a perspective view showing an optical system based on a lens array described in Patent Document 3.
Figure 2:
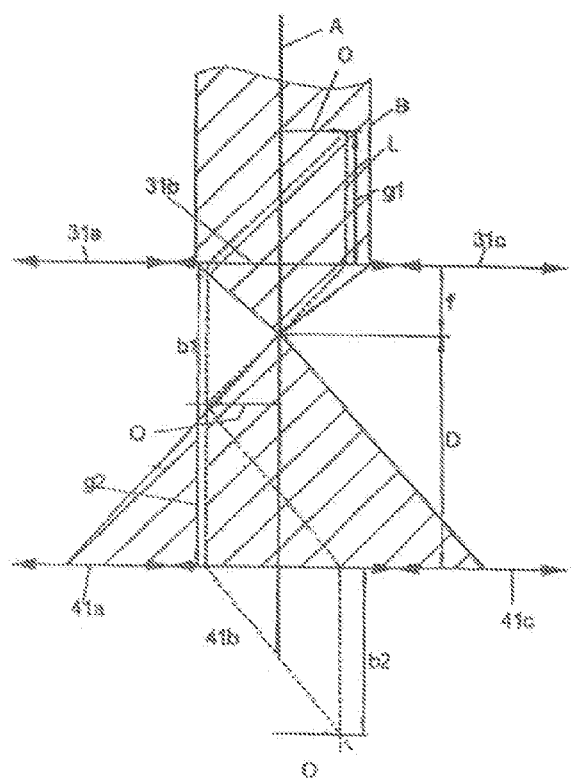
FIG. 2 is an optical path diagram thereof.
Figure 3:
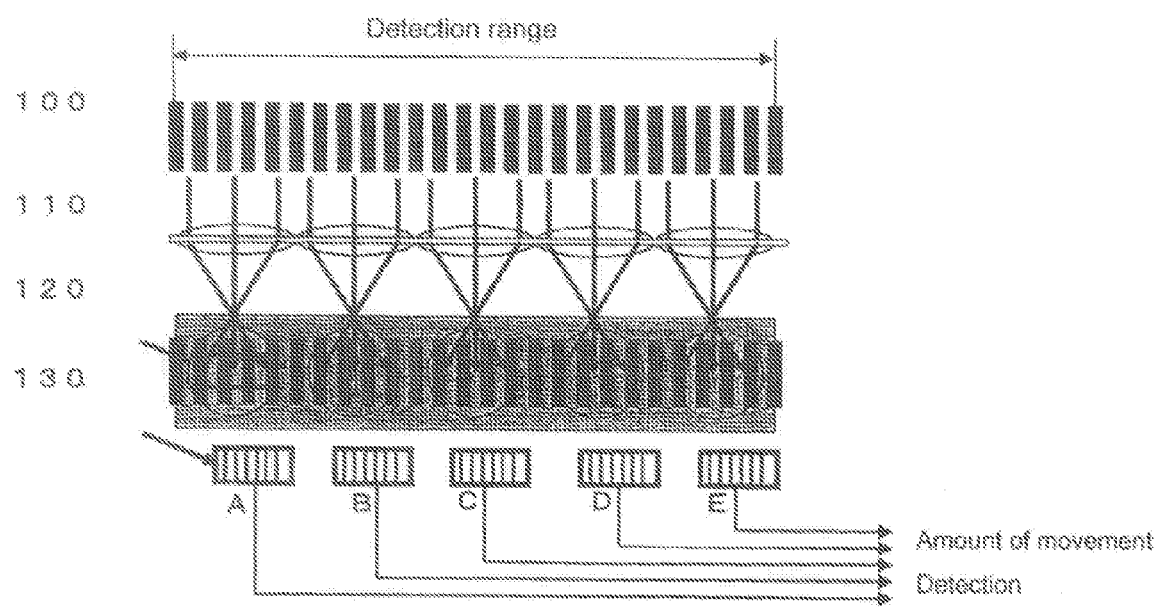
FIG. 3 is an optical path diagram, partially including a plan view, which schematically shows the major parts of Embodiment 1 of the present invention that is applied to an incremental encoder.

As shown in FIG. 3, Embodiment 1 of the present invention is such that the detection range of an incremental (INC) pattern 100 on a scale is divided into a plurality of detection areas 120, and disposed in the detection direction (that is, in the left and right direction in the drawing), wherein imaging optical systems 110 are provided with respect to respective detection areas, and light-receiving array elements 130A through E, which are smaller than the imaging area, are juxtaposed and disposed to each other.

At this time, left and right inverted images are imaged for the respective light-receiving array elements 130A through E.

In a case of detecting using the entire image in the detection range, it is necessary to invert the image again. Further, accuracy is required in regard to the relative positional relationship in the lengthwise direction of the detection areas. However, in the case of division and detection according to the present invention, they are no longer required, and the present invention can be comparatively simply configured.

That is, it becomes possible to obtain information in a wide detection range by disposing a plurality of detection areas even if one detection area is small.

Further, since it is sufficient that one detection area is small, lenses having a comparatively small diameter, the focal distance of which is short, can be used, wherein the optical system can be made small.

Still further, since the optical system is not influenced by the relative positional relationship (in the detection direction) of the detection areas, the lenses used for the optical system may be such that lens arrays as shown in FIG. 3, small-sized single lenses, and ball lenses are juxtaposed.

In FIG. 3, the light-receiving array elements 130 are juxtaposed in a plurality. However, it is sufficient that a plurality of array light-receiving portions are juxtaposed on a single long light-receiving element in the detection direction.

The sizes of the detection range and detection area may be optional. The sizes are determined by the size and disposed pitch of the lenses. Therefore, the sizes may be comparatively easily varied.

Figure 4:
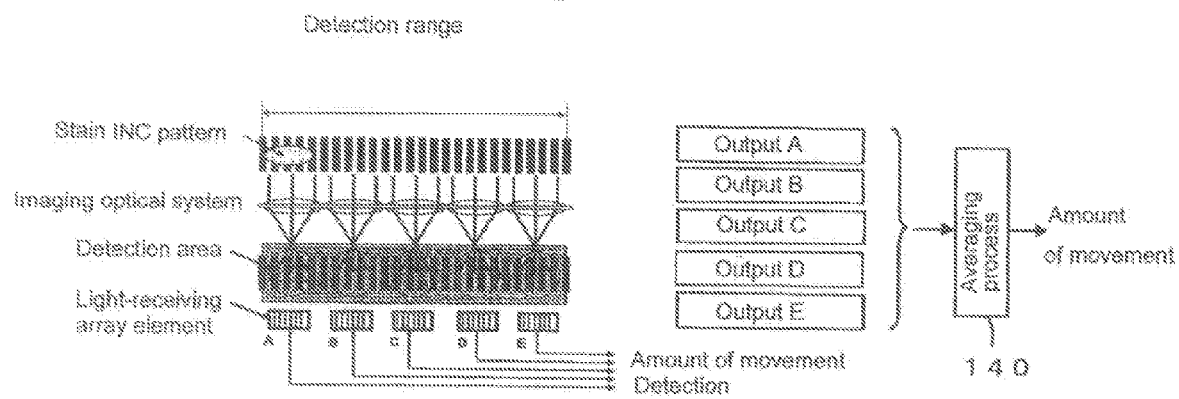
FIG. 4 is a block diagram showing a signal processing circuit thereof.

The output of the amount of movement of the encoder may be obtained by averaging the data of all the detection areas by means of an averaging process circuit 140 as shown in FIG. 4. Therefore, even if individual detection areas are small, a wide detection range is secured, wherein the sensitivity is reduced in a case where the detection range of the scale is partially stained.

Figure 5:
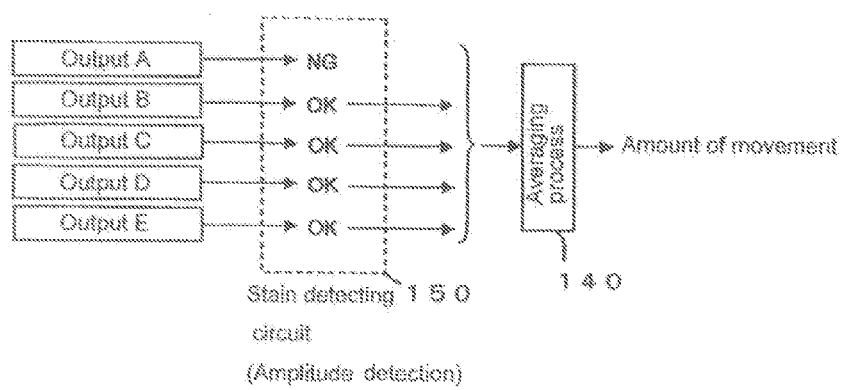
FIG. 5 is a block diagram showing a signal processing circuit according to Embodiment 2 of the present invention.

Also, as in Embodiment 2 shown in FIG. 5, a stain detection circuit 150 is provided, and the amplitudes of outputs of respective detection areas are detected, whereby a partial stain in the scale detection range can be detected, and an averaging process can be carried out in a range other than the stained part.

Figure 6:
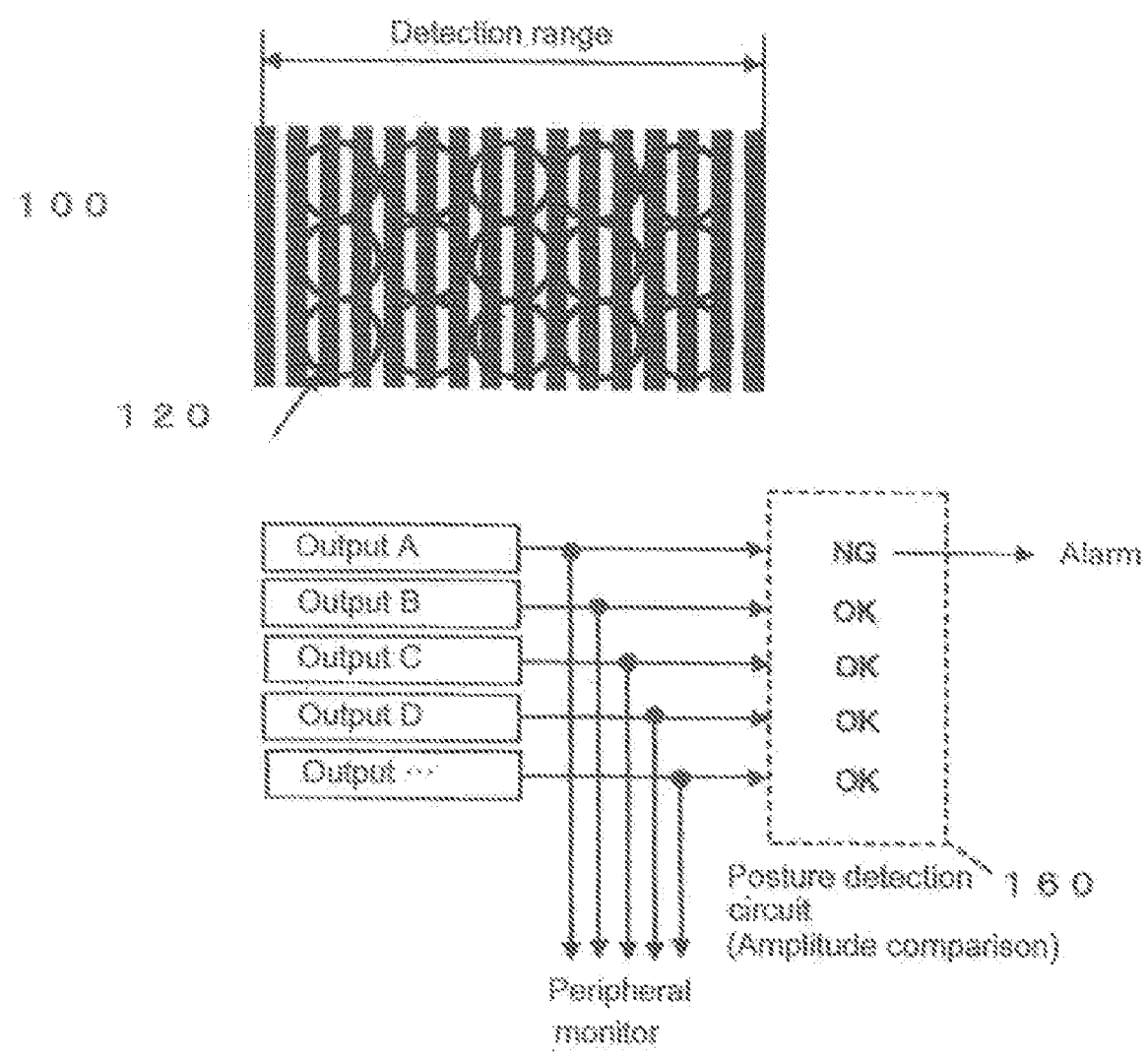
FIG. 6 is a plan view including a block diagram, which shows the major parts of Embodiment 3 of the present invention.

In addition, as in Embodiment 3 shown in FIG. 6, the detection range is two-dimensionally divided, and a plurality of imaging optical systems and light-receiving elements smaller than the imaging area are arranged two-dimensionally on the incremental pattern 100, and further a posture detection circuit 160 for comparing outputs of individual detection areas is provided, wherein it becomes possible to detect the posture such as yaw, pitch and roll, etc. By utilizing the posture detection circuit 160, it is possible to attempt to fulfill the functions such as an alarm function, and posture detection by means of peripheral monitors and so on. In addition, the pattern may be detected by two-dimensionally arranging a plurality of light-receiving array detecting portions on a single light-receiving element. Further, the pitch detection is enabled by one-dimensional division as shown in FIG. 3.

Figure 7:
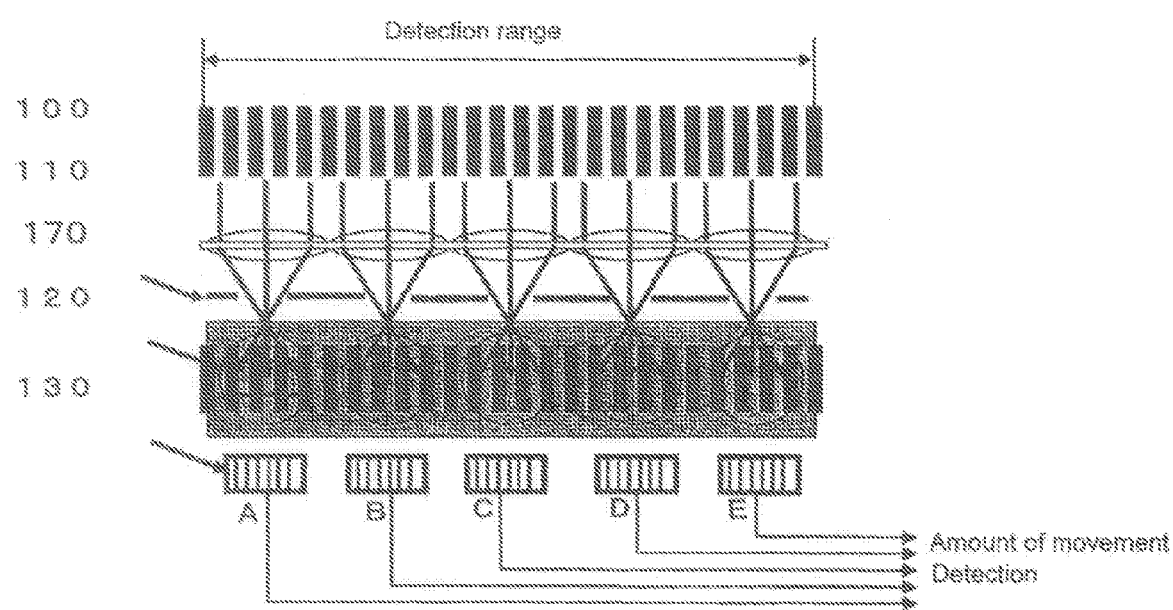
FIG. 7 is an optical path diagram, partially including a plan view, which schematically shows the major parts of Embodiment 4 of the present invention.

Further, as in Embodiment 4 shown in FIG. 7, by disposing a light-shielding plate 170 between the imaging optical systems 110, it is possible to prevent an image from being worsened due to light entering from adjacent lenses.

Next, a description is given of embodiments of the present invention that are applied to an absolute encoder.

Figure 8:
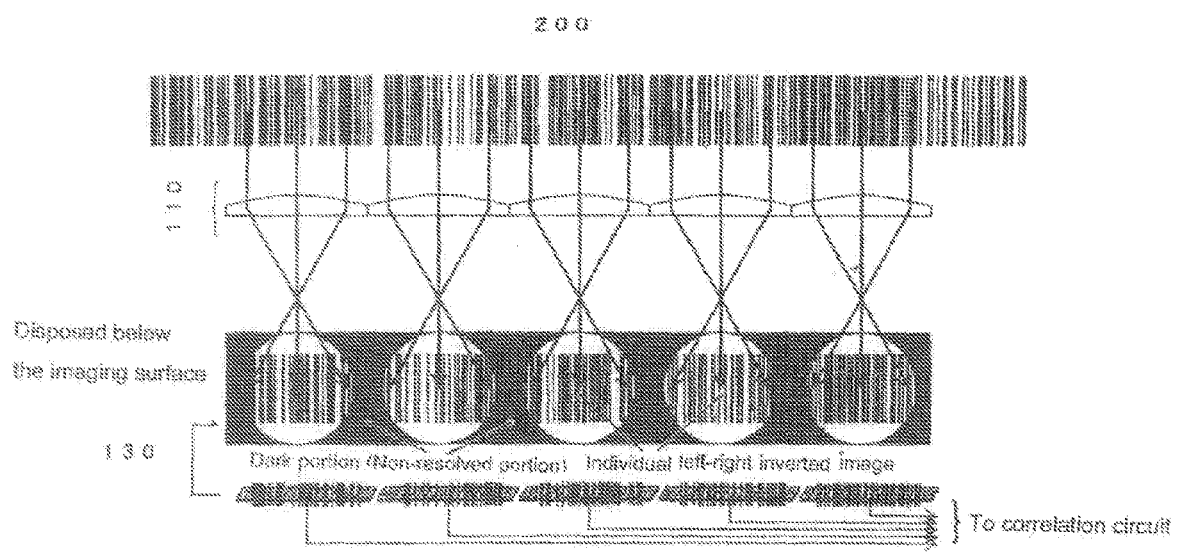
FIG. 8 is an optical path diagram, partially including a plan view, which schematically shows the major parts of Embodiment 5 of the present invention that is applied to an absolute encoder.

Embodiment 5 according to the present invention is devised, as shown in FIG. 8, so that a pseudorandom pattern 200 on an absolute scale is divided into a plurality of detection areas by, for example, an imaging optical system 110 composed of lens arrays, and the pattern is divided and detected by one-dimensional light-receiving array elements 130A through E disposed below the respective imaging surfaces.

Here, sizes of the detection range and detection area are optional. Further, there is no limitation that absolute position should be calculated only by detected data within individual detection range. They may be changed easily because they are determined by size and disposed pitch of lenses.

Although there is no restriction in the imaging magnification by individual lenses, left and right images interfere with each other in an enlarged optical system. The interference can be prevented by the light-shielding plates shown in Embodiment 4. However, in order to efficiently utilize the light amount from the scale, an equal-magnification or reduced optical system is preferable, the magnification of which is one time or less.

In addition, in FIG. 8, a plurality of light-receiving array elements 130 are juxtaposed. However, a plurality of array light-receiving portions may be provided on a single long light-receiving element.

Figure 9:
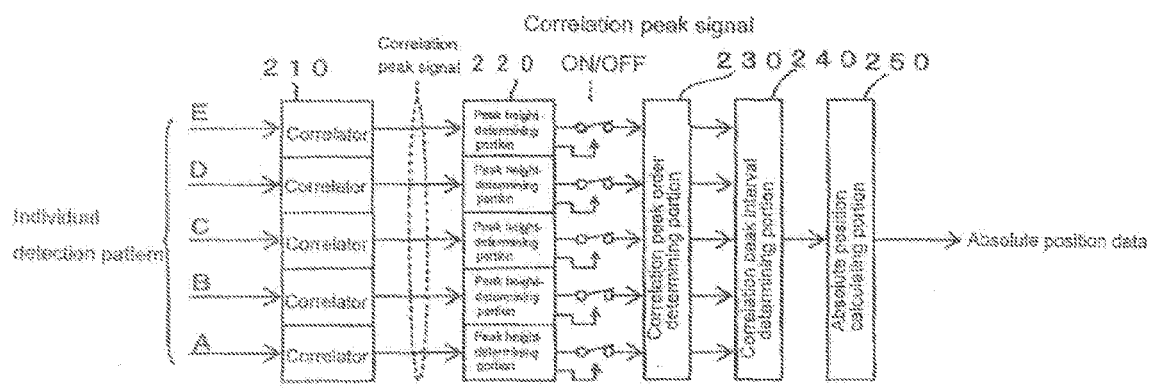
FIG. 9 is a block diagram showing a signal processing circuit thereof.
Figure 10:
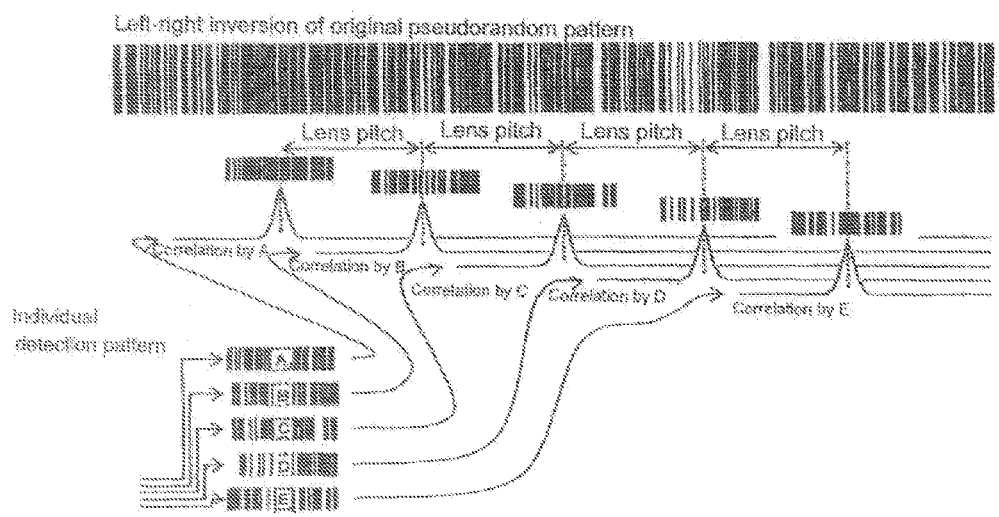
FIG. 10 is a view showing detailed processing thereof.

Divided individual detection patterns are subjected to individual correlation calculations by a correlator 210 of a signal processing circuit configured as shown in FIG. 9, along with the pseudorandom pattern that is the basis thereof. In this case, since the individual detection patterns are left-right inverted, the pseudorandom pattern that is the basis thereof is left-right inverted as shown in FIG. 10.

And, it is checked by a peak height-determining portion 220 whether or not the height of the correlation peak outputted from the correlator 210 is the threshold value or more.

Herein, the individual detection patterns are individually subjected to correlation calculation by the correlator 210. However, since there are a few data bits included in the individual detection patterns, the correlation peak is low.

Therefore, it is confirmed by the correlation peak order-determining portion 230 that the order of the individual correlation peaks are the same as the order of the detected positions, and it is also checked by the correlation peak interval-determining portion 240 that the interval between the correlation peaks is the same as the lens pitch or the disposed pitch of the light-receiving array elements. Finally, the position is decided as the absolute position on the pseudorandom pattern by the absolute position-calculating portion 250.

Also, in the comparison of the pitch intervals, the disposition tolerance or one obtained by multiplying the disposition tolerance by the optical magnification may be made into an allowance.

Figure 11:
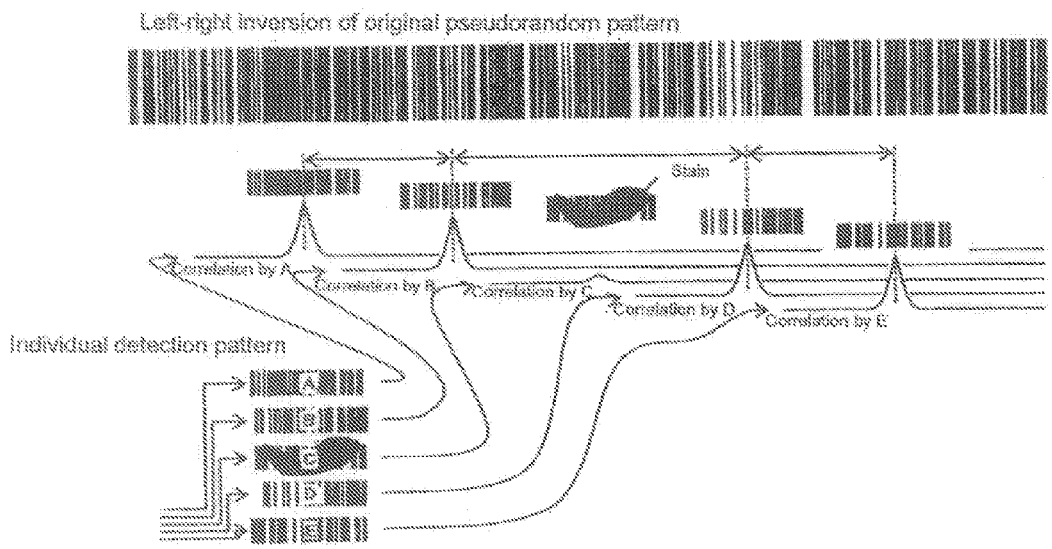
FIG. 11 is a view showing a case where the correlation peak is made low due to a stain in Embodiment 5.

Further, as shown in FIG. 11, if a stain exists on a part of the scale, a specified individual pattern becomes unclear, wherein there is a fear that the correlation peak is made low. In such circumstances, the order and interval of the correlation peaks can not be checked correctly. Therefore, the height of the correlation peak is checked by the peak height-determining portion 220 to avoid such circumstances. And, if the height is lower than a specified height, the corresponding individual detection patterns are not used for correlation calculation, and the correlation calculation is carried out by using the remaining individual detection patterns.

The specified height is established by setting the height to, for example, half the highest correlation peak. Or, in a case where an M-sequence code, which is generated by an "N"-stage shift register, is used as the pseudorandom pattern, the maximum value of a correlation value obtained from a pattern whose bit length is (2×N−1) may be set.

Accordingly, it becomes possible to securely detect a long pseudorandom pattern without use of a large optical system and a plurality of lens array imaging optical systems.

Figure 12:
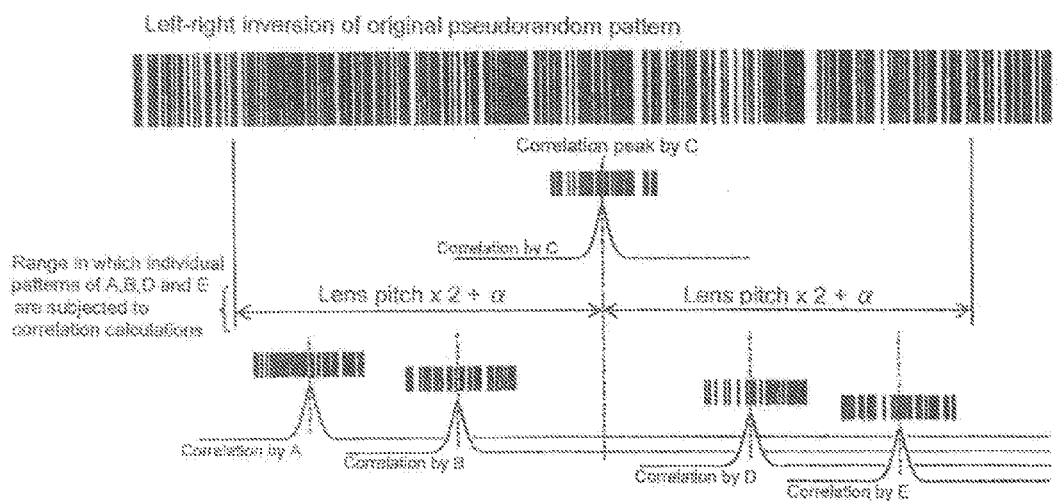
FIG. 12 is a view showing detailed processing in Embodiment 6 of the present invention.

Further, since, in Embodiment 5, the individual detection patterns are subjected to individual correlation calculations, the calculation time will be increased in proportion to the number of detection patterns where the periodic cycle is long. Therefore, in Embodiment 6 shown in FIG. 12, the correlation calculation method is improved, wherein the correlation calculation is carried out in the entire area of the periodic cycle only in a specified individual detection pattern (C in FIG. 12), and the highest correlation peak is obtained. And, since the correlation peaks based on the other individual detection patterns are probably provided in the surrounding of the highest correlation peak, the range of the correlation calculation is narrowed ($\pm(2+\alpha)$ in FIG. 12, here, $\alpha$ is an allowance when an error in lens pitch and an error in magnification are taken into consideration), and correlation calculations are individually carried out in the range.

If the correlation peak of the other individual detection patterns is not in the range, the second highest correlation peak is obtained (or stored in the correlation calculation executed for the first time) after judging that the correlation peak detected for the first time was erroneous, and the same process as above is carried out.

Accordingly, it is possible to prevent the calculation time from increasing when obtaining the correlation peaks of a plurality of individual detection patterns.

Figure 13:
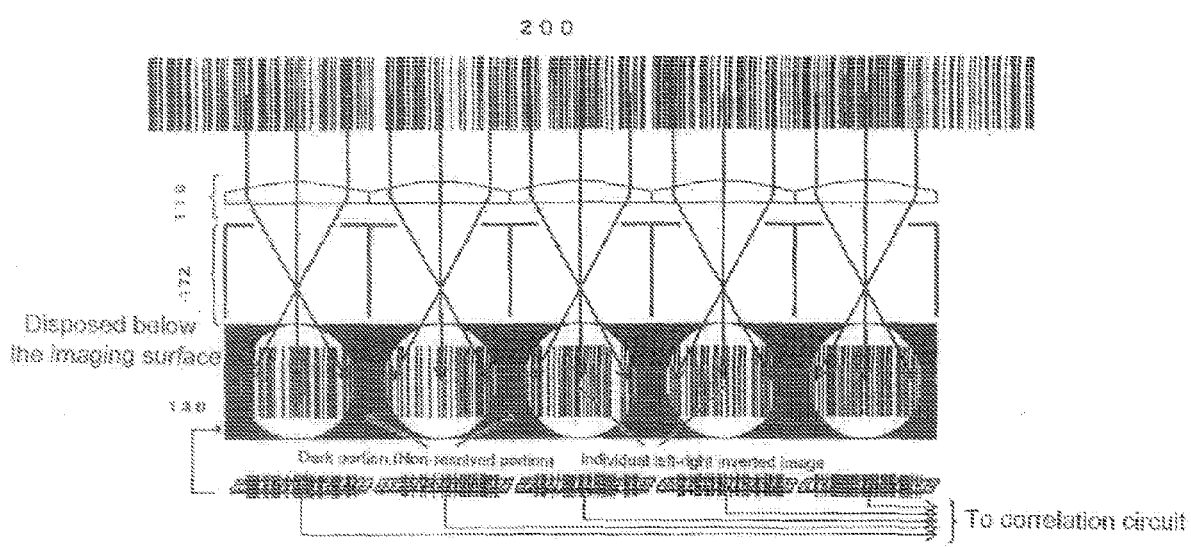
FIG. 13 is an optical path diagram, partially including a plan view, which schematically shows the major parts of Embodiment 7 of the present invention.

Further, as in Embodiment 7 shown in FIG. 13, by disposing the light shielding plate 172 between the lens array imaging optical systems 110, it is possible to prevent an image from being worsened due to light entering from adjacent lenses.

Figure 14:
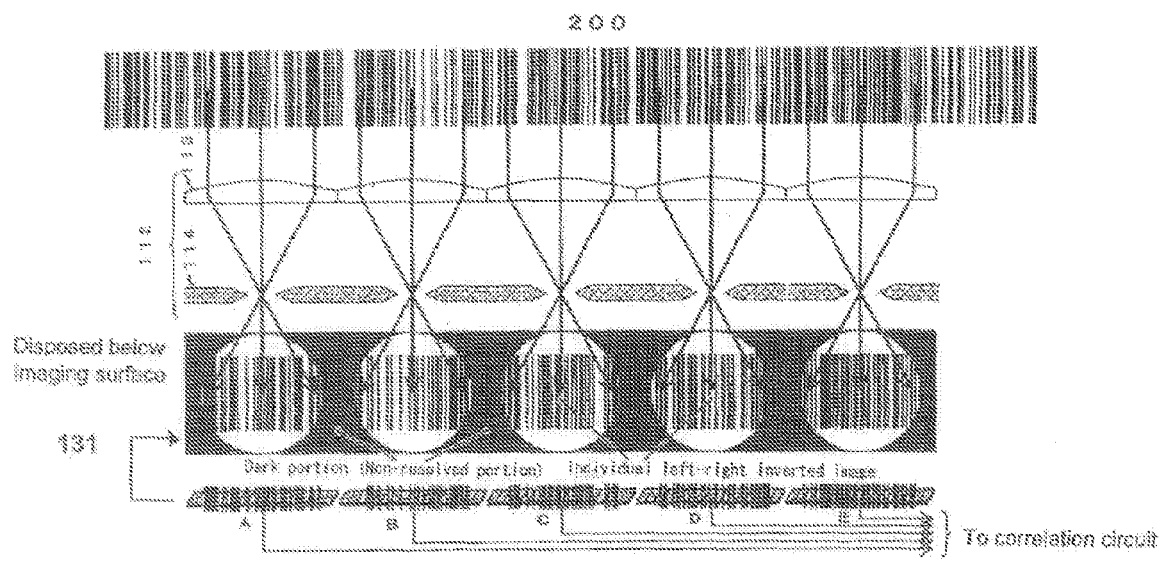
FIG. 14 is an optical path diagram, partially including a plan view, which schematically shows the major parts of Embodiment 8 of the present invention.

Still further, as in Embodiment 8 shown in FIG. 14, it is possible to restrict the NA of the imaging system with the image optical system made into a single-side telecentric optical system 112 in which an aperture plate 114 is disposed between the lens array 113 and the light-receiving array element 130. Accordingly, since the focal depth can be widened, it is possible to compose a detection system the sensitivity of which is low with respect to air gap fluctuation with the scale and positional fluctuation in arrangement of light-receiving elements.

Figure 15:
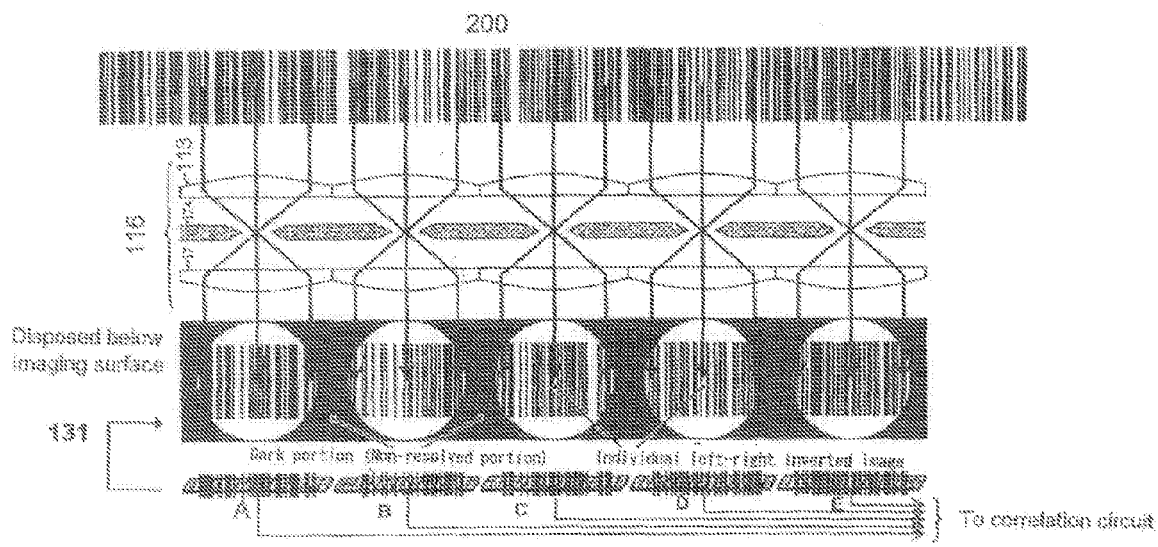
FIG. 15 is an optical path diagram, partially including a plan view, which schematically shows the major parts of Embodiment 9 of the present invention.

Or, as in Embodiment 9 shown in FIG. 15, the imaging optical system is made into a double-side telecentric optical system 116 in which the lens array 117 is also disposed at the opposite side of the aperture plate 114, wherein it is possible to compose a detection system the sensitivity of which is low with respect to air gap fluctuation with the scale and positional fluctuation in arrangement of light-receiving elements. Two lens arrays 113 and 117 are stacked in the double-side telecentric optical system 116. However, no intermediate image is generated as in Patent Document 3. Therefore, the allowance in the distance between the lens arrays is wide in comparison with the two-stacked lens arrays as in Patent Document 3.

In addition, in Embodiments 8 and 9, the telecentric optical system is applied to an absolute encoder. However, a single-side or a double-side telecentric optical system may be applicable to an incremental encoder.

Figure 16:
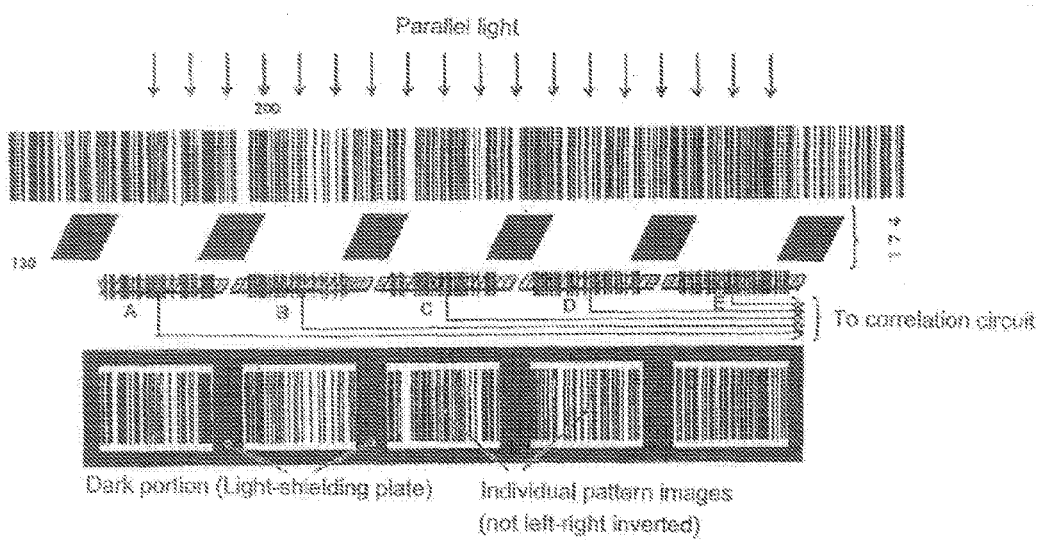
FIG. 16 is an optical path diagram, partially including a plan view, which schematically shows the major parts of Embodiment 10 of the present invention.

Also, as in Embodiment 10 shown in FIG. 16, by irradiating parallel light to the scale and disposing a light shielding plate 174 between the light-receiving systems as necessary, it is possible to detect a pseudorandom pattern on the scale without any imaging optical system. In this case, since the individual detection patterns are not left-right inverted, the pseudorandom pattern that becomes the basis is not left-right inverted when carrying out correlation calculations.

Accordingly, even with the light-receiving array elements 130A through E which are smaller than the detection range, it is possible to respond to a pseudorandom pattern of a long periodic cycle by juxtaposing the elements and carrying out correlation calculations with the pseudorandom pattern divided and detected.

Figure 17:
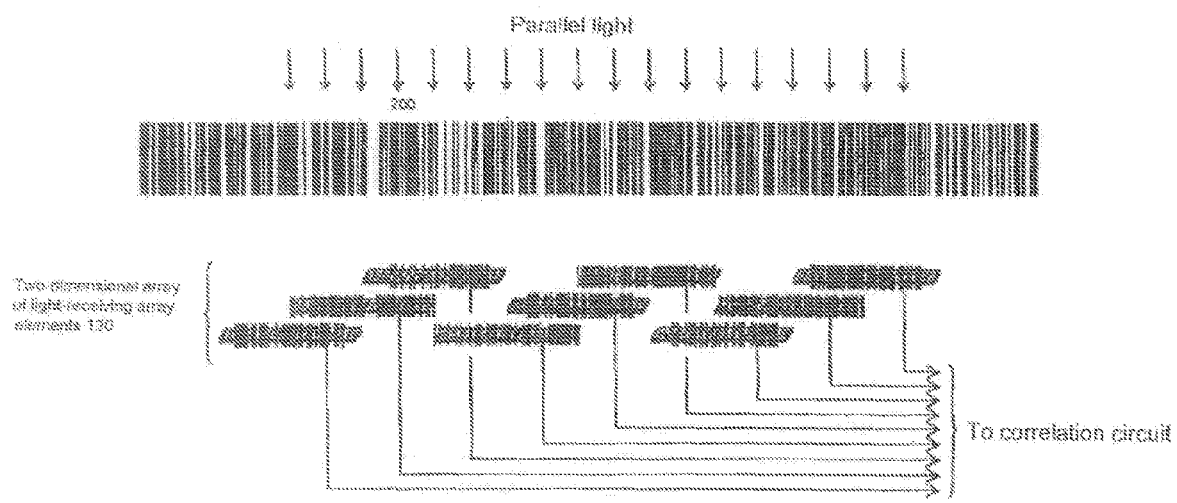
FIG. 17 is an optical path diagram, partially including a perspective view, which schematically shows the major parts of Embodiment 11 of the present invention.

Further, as in Embodiment 11 shown in FIG. 17, the light-receiving array elements that are smaller than the detection range are two-dimensionally disposed by a plurality in the detection direction and the direction perpendicular thereto. Accordingly, the detection is hardly influenced by stains on the scale, and the reliability of detecting the absolute position can be improved by virtue of a number of individual correlation peaks close to each other.

Figure 18:
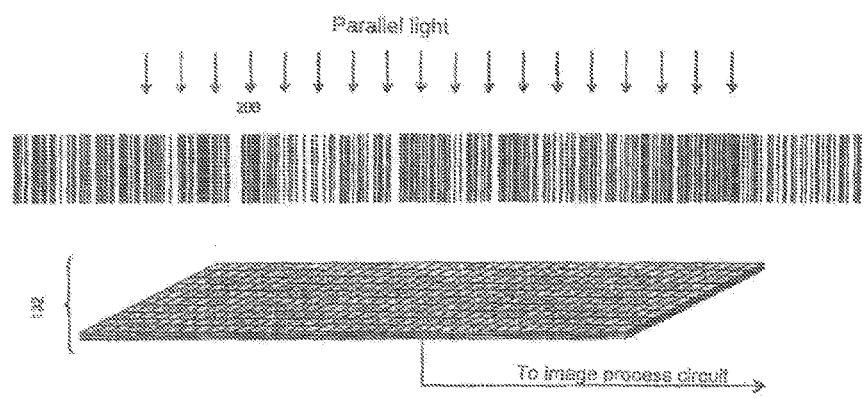
FIG. 18 is an optical path diagram, partially including a perspective view, which schematically shows the detection portion of Embodiment 12 of the present invention.

Still further, as in Embodiment 12 shown in FIG. 18, the pseudorandom pattern can be detected by using a single two-dimensional light-receiving array element 132.

Figure 19:
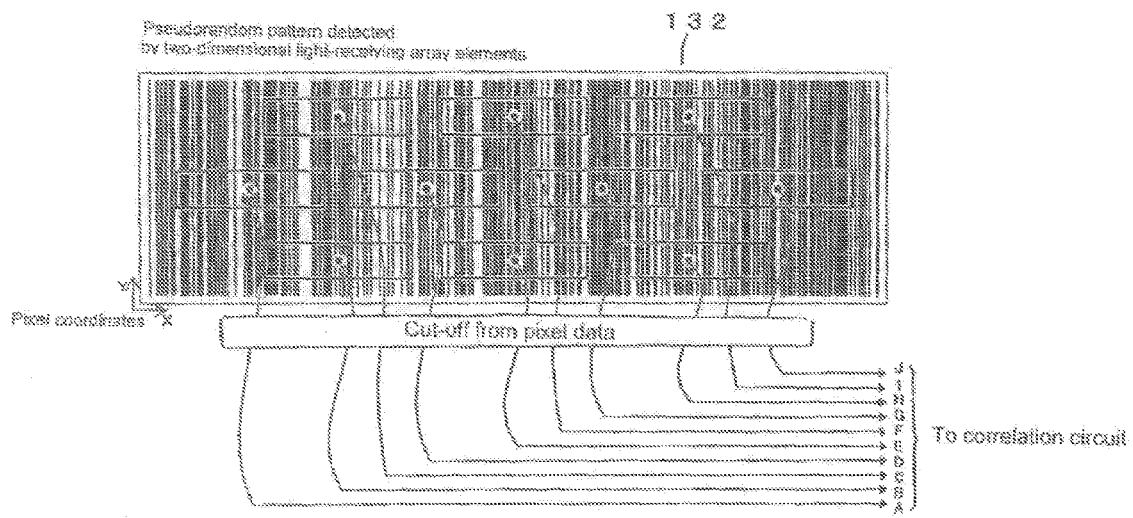
FIG. 19 is a plan view showing a cut-off position of individual detection patterns according to Embodiment 12.
Figure 20:
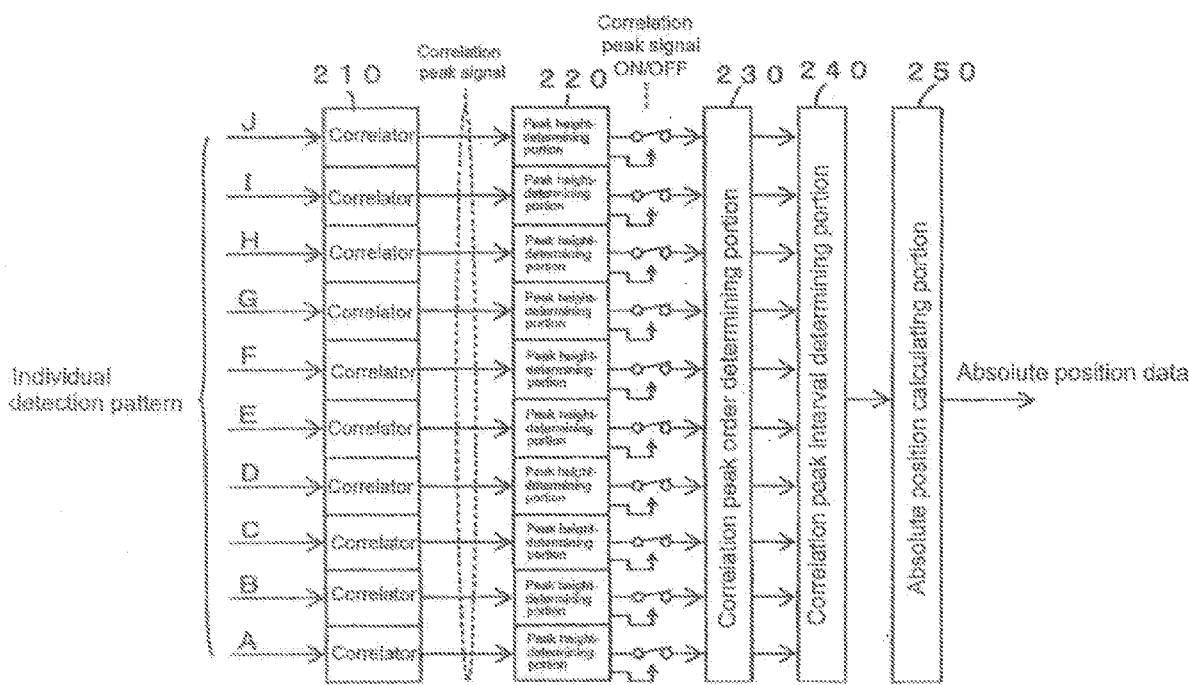
FIG. 20 is a block diagram showing a signal processing circuit according to Embodiment 12.
Figure 21:
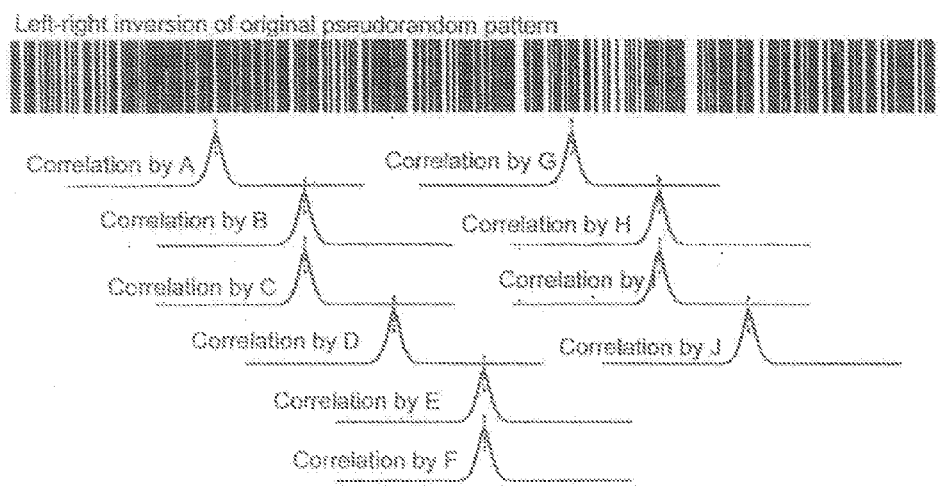
FIG. 21 is a view showing one example of individual correlation peaks according to Embodiment 12.

As shown in FIG. 19, in the present embodiment, individual detection patterns are cut off from the two-dimensional image data obtained, and correlation calculations are carried out for each of the individual detection patterns as shown in FIG. 20. Also, as shown in FIG. 21, the order and interval of the respective correlation peaks are checked to determine the absolute position.

Figure 22:
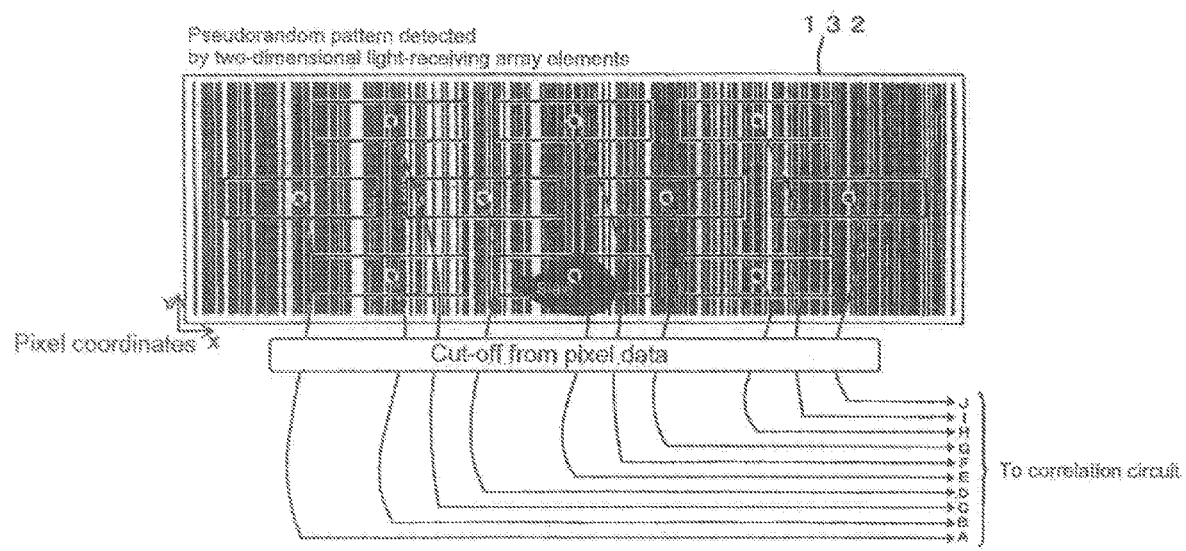
FIG. 22 is a plan view showing a case where a stain is taken, according to Embodiment 12.
Figure 23:
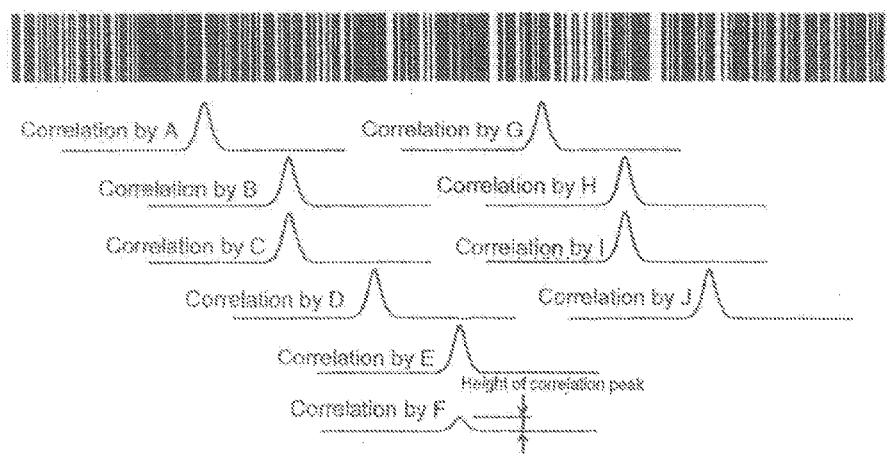
FIG. 23 is a view showing a correlation peak in the case where a stain is taken, according to Embodiment 12.

FIG. 22 shows a state where a stain exists on the scale, an image of the stain is taken just on the individual detection pattern E, and the pattern is made unclear. If the individual detection pattern is thus stained and taken, the correlation peak height becomes low as shown in FIG. 23, wherein it is not possible to accurately judge the order and interval of correlation peaks. To prevent such a situation, the height of the correlation peaks is checked in the peak height-determining portion 220 in FIG. 20. And, if the height is lower than a predetermined height, the corresponding individual detection pattern is not used for correlation calculations, and the correlation calculation is carried out by using the remaining individual detection patterns.

Figure 24:
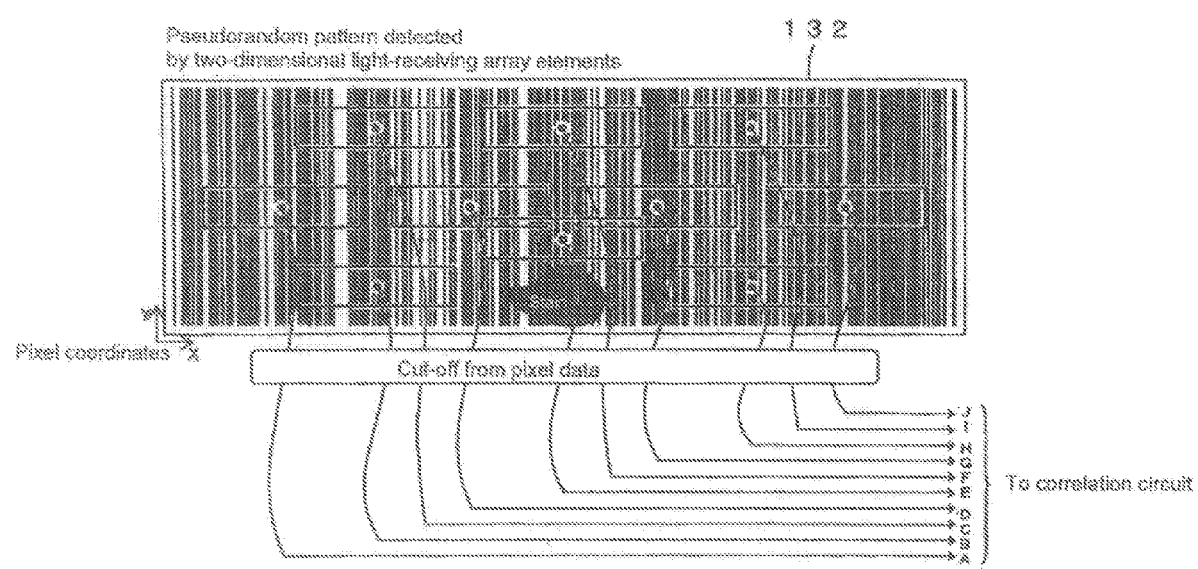
FIG. 24 is a plan view showing a process according to Embodiment 13 of the present invention.

In addition, if a stain is taken, the light amount of the corresponding portion is reduced. Therefore, as in Embodiment 13 shown in FIG. 24, it is judged that any portion whose light amount is lower than the average light amount in the range of two-dimensional image data is stained, and the individual detection patterns can be cut off, avoiding the corresponding portion.

With the method, absolute position detection can be achieved, which is not influenced by stains on the scale.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

The invention claimed is:

1. A photoelectric encoder having a detector, the detector comprising:
a plurality of light-receiving systems; and
a plurality of imaging optical systems corresponding to the plurality of light-receiving systems,
wherein the detector is displaceable relative to a scale, the scale having a predetermined pattern formed thereon,
wherein a detection range of the pattern is divided in a detection direction into a plurality of detection areas,
wherein the plurality of light-receiving systems simultaneously detect the pattern via the plurality of detection areas,
wherein the plurality of imaging optical systems invert an image for the corresponding light-receiving system, and
wherein a light-shielding plate is disposed between the light-receiving systems.

2. The photoelectric encoder according to claim 1, wherein the imaging optical system is a single-side or a double-side telecentric optical system.

3. The photoelectric encoder according to claim 1, wherein the detection range is divided in a direction perpendicular to the detection direction.

4. The photoelectric encoder according to claim 1, wherein partial staining of the detection range is detected by an amplitude of outputs of divided and detected points.

5. The photoelectric encoder according to claim 4, wherein an output of points other than the point where staining is detected is used for detection of displacement.

6. The photoelectric encoder according to claim 1, wherein the pattern is an incremental pattern.

7. The photoelectric encoder according to claim 6, wherein an amount of movement is detected by averaging the outputs of the divided and detected points.

8. The photoelectric encoder according to claim 6, wherein posture detection of the detector is carried out by relative comparison of outputs of the divided and detected points.

9. The photoelectric encoder according to claim 1, wherein the pattern is a pseudorandom pattern.

10. The photoelectric encoder according to claim 9, wherein the divided and detected patterns are individually subjected to correlation calculations, and a position at which an order of the correlation peaks is accurate and an interval between the respective correlation peaks is within a predetermined range is judged to be an absolute position.

11. The photoelectric encoder according to claim 10, wherein the corresponding individual detection pattern where a height of the correlation peak is lower than a threshold value, is not used for correlation calculations.

12. The photoelectric encoder according to claim 10, wherein to obtain a highest correlation peak a correlation calculation is carried out in an entire area of the periodic cycle with respect to one of a plurality of individual detection patterns, and wherein additional correlation calculations are carried out in other individual detection patterns in the area surrounding the one individual detection pattern.

* * * * *